(12) United States Patent
Naik

(10) Patent No.: US 11,444,953 B2
(45) Date of Patent: Sep. 13, 2022

(54) METHODS, SYSTEMS, APPARATUSES AND DEVICES FOR FACILITATING SECURITY OF A RESOURCE USING A PLURALITY OF CREDENTIALS

(71) Applicant: Dharmesh Naik, Beau Bassin (MU)

(72) Inventor: Dharmesh Naik, Beau Bassin (MU)

( * ) Notice: Subject to any disclaimer, the term of this patent is extended or adjusted under 35 U.S.C. 154(b) by 265 days.

(21) Appl. No.: 16/541,426

(22) Filed: Aug. 15, 2019

(65) Prior Publication Data

US 2020/0186535 A1 Jun. 11, 2020

Related U.S. Application Data

(60) Provisional application No. 62/776,052, filed on Dec. 6, 2018.

(51) Int. Cl.
| | |
|---|---|
| *H04L 29/06* | (2006.01) |
| *H04L 9/40* | (2022.01) |
| *H04W 12/06* | (2021.01) |
| *H04W 12/63* | (2021.01) |

(52) U.S. Cl.
CPC ............ *H04L 63/105* (2013.01); *H04L 63/08* (2013.01); *H04W 12/06* (2013.01); *H04L 2463/082* (2013.01); *H04W 12/63* (2021.01)

(58) Field of Classification Search
CPC ....... H04L 63/105; H04L 63/08; H04L 63/10; H04L 63/108; H04L 63/0876; H04L 2463/082; H04W 12/06
See application file for complete search history.

(56) References Cited

U.S. PATENT DOCUMENTS

| | | | |
|---|---|---|---|
| 7,278,024 B2 | 10/2007 | Sundararajan et al. | |
| 8,291,470 B2 | 10/2012 | Delia et al. | |
| 8,413,219 B2 | 4/2013 | Downey et al. | |
| 8,467,387 B2 * | 6/2013 | Chaturvedi | H04L 61/2575 370/389 |
| 9,038,148 B1 * | 5/2015 | Roth | H04L 67/14 726/5 |
| 9,231,981 B2 | 1/2016 | Delia et al. | |
| 10,255,415 B1 * | 4/2019 | Siavoshy | G06F 21/6209 |
| 10,628,244 B1 * | 4/2020 | Cseri | G06F 9/547 |
| 10,833,843 B1 * | 11/2020 | Vijayvergia | H04L 9/3242 |
| 10,855,664 B1 * | 12/2020 | Ziraknejad | H04W 4/021 |

(Continued)

FOREIGN PATENT DOCUMENTS

WO WO2007015253 A2 4/2009

*Primary Examiner* — Tongoc Tran

(57) ABSTRACT

Disclosed herein is a system for facilitating security of a resource using a plurality of credentials, in accordance with some embodiments. Accordingly, the system may include a communication device configured for receiving a user credential associated with a user from a user device to access one or more services of the resource, and obtaining a current contextual data from the user device. Further, the system may include a storage device configured for retrieving a stored contextual data and a stored credential associated with the user from a database. Further, the system may include a processing device configured for comparing the user credential with the stored credential, analyzing the current contextual data and the stored contextual data, and authenticating the user device based on the comparing and the analyzing to determine a level of access to the one or more services of the resource by the user device.

14 Claims, 10 Drawing Sheets

(56) References Cited

U.S. PATENT DOCUMENTS

| | | |
|---|---|---|
| 11,115,224 B1* | 9/2021 | Scofield ................ H04L 9/0825 |
| 2010/0169151 A1 | 7/2010 | Xu |
| 2015/0172263 A1 | 6/2015 | Kluesing et al. |
| 2017/0208038 A1* | 7/2017 | Hinaman ............... H04L 63/083 |
| 2019/0028514 A1* | 1/2019 | Barboi ................... H04L 63/10 |
| 2019/0246170 A1* | 8/2019 | Sreekanth ............. H04L 63/102 |
| 2019/0364049 A1* | 11/2019 | Boss ....................... G06F 21/45 |
| 2020/0162359 A1* | 5/2020 | Borkar ................... H04L 43/08 |
| 2020/0371965 A1* | 11/2020 | Medvedeva .......... G06F 21/602 |

* cited by examiner

METHODS, SYSTEMS, APPARATUSES AND DEVICES FOR FACILITATING SECURITY OF A RESOURCE USING A PLURALITY OF CREDENTIALS

The current application claims a priority to the U.S. Provisional Patent application Ser. No. 62/776,052 filed on Dec. 6, 2018.

FIELD OF THE INVENTION

Generally, the present disclosure relates to the field of data processing. More specifically, the present disclosure relates to methods, systems, apparatuses and devices for facilitating security of a resource using a plurality of credentials.

BACKGROUND

Hackers operate online from a distance and gather credentials such as login ids, passwords from unsecured connections such as Public Wi-Fi at airports or at hotels or at any public places. Further, once the credentials may be availed by the hacker, the hacker may attempt to hack an account from a far-away place. Further, geolocation allows conventional systems to detect an IP address associated with a location from where a user may be accessing the online account. Further, a real account owner may receive emails as reminders and/or alerts when an unknown device tries to login into the online account associated with the real account owner. However, conventional system's security features would not block any access from the unknown device but rather may ask the real account owner to react if he/she believes it was a malicious access attempt or not.

Therefore, there is a need for improved methods, systems, apparatuses and devices for facilitating security of a resource using a plurality of credentials that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating security of a resource using a plurality of credentials, in accordance with some embodiments. Accordingly, the method may include receiving, using a communication device, a user credential associated with a user from a user device to access one or more services of the resource. Further, the method may include obtaining, using the communication device, a current contextual data from the user device. Further, the method may include retrieving, using a storage device, a stored contextual data and a stored credential associated with the user from a database. Further, the method may include comparing, using a processing device, the user credential with the stored credential. Further, the method may include analyzing, using the processing device, the current contextual data and the stored contextual data. Further, the method may include authenticating, using the processing device, the user device based on the comparing and the analyzing to determine a level of access to the one or more services of the resource by the user device.

Further disclosed herein is a system for facilitating security of a resource using a plurality of credentials, in accordance with some embodiments. Accordingly, the system may include a communication device configured for receiving a user credential associated with a user from a user device to access one or more services of the resource. Further, the communication device may be configured for obtaining a current contextual data from the user device. Further, the system may include a storage device configured for retrieving a stored contextual data and a stored credential associated with the user from a database. Further, the system may include a processing device configured for comparing the user credential with the stored credential. Further, the processing device may be configured for analyzing the current contextual data and the stored contextual data. Further, the processing device may be configured for authenticating the user device based on the comparing and the analyzing to determine a level of access to the one or more services of the resource by the user device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
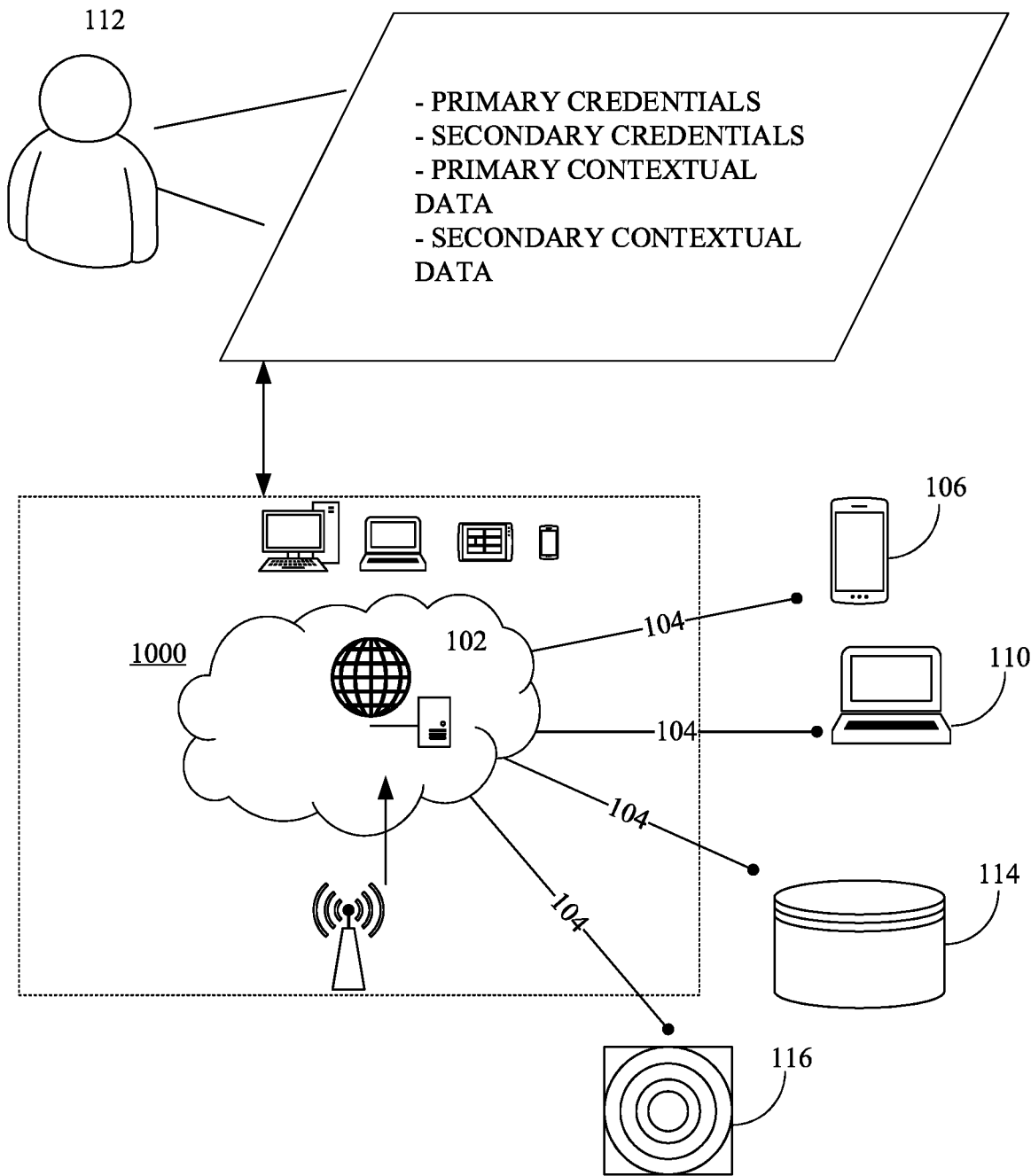
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of security of a resource using a plurality of credentials, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer.

Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

Two Passwords is a security concept which is trademarked, with an aim of establishing a new way of protecting online accounts from hackers, identity thefts, and additional protection. The concept of having two passwords, in an instance, may be no different to having a new car with two sets of keys, or even when buying a door lock, which comes with at least 2 keys.

Further, the present disclosure, in an instance, may include a hacker-proof security concept (Make an account hacker proof). Accordingly, it may be rare that a hacker may be present within the same location as a user. The hackers operate online from a distance, and whether over an unsecured connection at the airport or a hotel or any public place, they (hackers) would gather information (such as login, password) and once availed, may attempt to hack the user's account from a far-away place (remote location). Further, geolocation, in an instance, may allow systems to detect an IP address (thus location) of where someone may be accessing the user's account from. Further, current system security features may not block access but rather send the user a reminder asking the user to react if the user believes that a login attempt was not done by the user. Perhaps a reaction from the user may be too late already? So, what if when the user may be traveling, and outside of a usual location (the user's usual IP), the user's account is automatically locked when accessed using a primary password? (as it's only the user who knows that whilst traveling, the user has to use a second password). Further, the use of the second password already locks down the IP from which the user has accessed the account and hence may prevent access from any other IP. So for a starter, the hacker may intercept a password which will not work. So the concept of two passwords for one account already secures online information without a need to receive a security question, when getting the security question may be too late. Once the user may be back home, the user may start using the account with the primary password (or first password).

Further, the present disclosure, in an instance, may include a limited access security concept (Give less, rather than more). Accordingly, a new form of crime, very commonly related to traditional thefts, would be when a malicious person may be physically present and forcing the user to login into the user's account and transfer funds to them (malicious person's account). Where life is more important than money, what if the user may log in with a username and password and still access the online account (using perhaps a traditional OTP verification on the basis that the user has a phone with them) but actually gives a limited version of balance on the account. In such a scenario, the user's bank may not doubt any transactions provided the user may have cleared all security procedures for online access and transfer and provided a confirmed OTP to validate a transaction. The second password, when set on the system, could first of all, give limited balance visually on screen and may allow a limited transfer. For instance, if the user's account has US$ 55,000, the use of the second password would display a balance of only US$2,346. Further, the user may be able to set such limits. Additionally, the system may also send a hidden message to the user's banker that something is wrong. So whilst the transfer may seem to proceed online, the bank may effectively block the transfer internally and also report the recipient account as being a perpetrator. Likewise, the two password concept for the security of an account may be extrapolated to various examples.

FIG. 1 is an illustration of an online platform 100 consistent with various embodiments of the present disclosure. By way of non-limiting example, the online platform 100 to facilitate security of a resource using a plurality of credentials may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1000.

Figure 2:
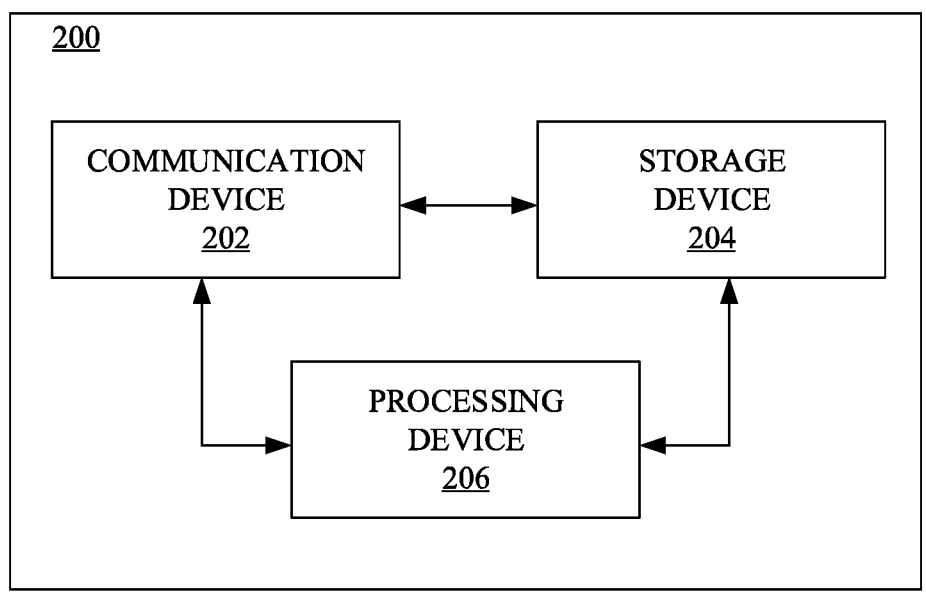
FIG. 2 is a block diagram representation of a system for facilitating security of a resource using a plurality of credentials, in accordance with some embodiments.

FIG. 2 is a block diagram representation of a system 200 for facilitating security of a resource using a plurality of credentials, in accordance with some embodiments. Accordingly, the system 200 may include a communication device 202 configured for receiving a user credential associated with a user from a user device to access one or more services of the resource. Further, in some embodiments, the resource may include at least one of an email account, an e-wallet, a website, an E-vault, and a bank account. Further, in some embodiments, the one or more services may include at least one of accessing emails, and transaction of assets (for e.g. e-funds, data, crypto keys, crypto-currencies, etc.).

Further, the communication device 202 may be configured for obtaining a current contextual data from the user device.

Further, the system 200 may include a storage device 204 configured for retrieving a stored contextual data and a stored credential associated with the user from a database. Further, in some embodiments, the stored contextual data may include at least one of a primary contextual data, and a secondary contextual data. Further, in some embodiments, the stored credential may include at least one of a primary credential and a secondary credential. Further, in some embodiments, the user may be provided a full access to the one or more services if the primary credential may be received from the user device. Further, the user may be provided a limited access to the one or more services if the secondary credential may be received from the user device.

Further, the system 200 may include a processing device 206 configured for comparing the user credential with the stored credential.

Further, the processing device 206 may be configured for analyzing the current contextual data and the stored contextual data.

Further, the processing device 206 may be configured for authenticating the user device based on the comparing and the analyzing to determine a level of access to the one or more services of the resource by the user device. Further, in some embodiments, the level of access may include at least one of a full access to the one or more services, a limited access to the one or more services, and a no access to the one or more services.

In some embodiments, the communication device 202 may be further configured for receiving the secondary credential from the user device. Further, the processing device 206 may be configured for limiting an accessibility to the one or more services of the resource based on the receiving. Further, in some embodiments, the processing device 206 may be configured for initiating an implicit communication with at least one authorized device based on the limiting. Further, the at least one authorized device may be operated by at least one appropriate authority (such as, but not limited to, a bank official, police personnel, government official, etc.).

In some embodiments, the communication device 202 may be further configured for receiving a primary credential and a primary contextual data from the user device. Further, the communication device 202 may be configured for receiving a secondary credential and a secondary contextual data from the user device. Further, the processing device 206 may be configured for mapping the primary credential with the primary contextual data. Further, the processing device 206 may be configured for mapping the secondary credential with the secondary contextual data. Further, the processing device 206 may be configured for generating a user account associated with the user based on the mapping. Further, the storage device 204 may be configured for storing the user account in a database.

Figure 3:
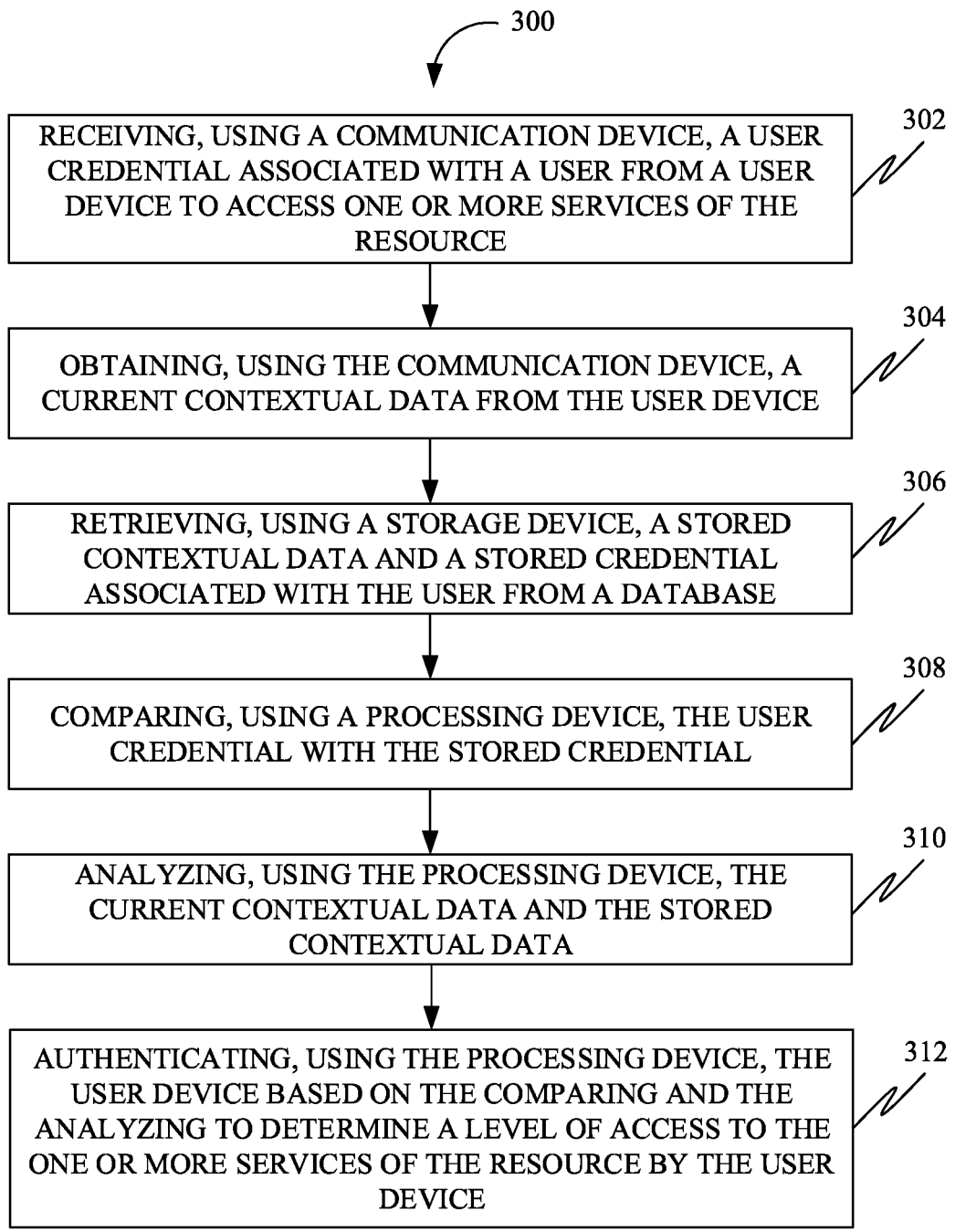
FIG. 3 is a flowchart of a method for facilitating security of a resource using a plurality of credentials, in accordance with some embodiments.

FIG. 3 is a flowchart of a method 300 for facilitating security of a resource using a plurality of credentials, in accordance with some embodiments. Accordingly, at 302, the method 300 may include receiving, using a communication device (such as the communication device 202), a user credential associated with a user from a user device to access one or more services of the resource. Further, in some embodiments, the resource may include at least one of an email account, an e-wallet, a website, an E-vault, and a bank account. Further, in some embodiments, the one or more services may include at least one of accessing emails, and transaction of assets (for e.g. e-funds, data, crypto keys, crypto-currencies, etc.).

Further, at 304, the method 300 may include obtaining, using the communication device, a current contextual data from the user device.

Further, at 306, the method 300 may include retrieving, using a storage device (such as the storage device 204), a stored contextual data and a stored credential associated with the user from a database. Further, in some embodiments, the stored contextual data may include at least one of a primary contextual data, and a secondary contextual data. Further, in some embodiments, the stored credential may include at least one of a primary credential and a secondary credential. Further, in some embodiments, the user may be provided a full access to the one or more services if the primary credential may be received from the user device.

Further, the user may be provided a limited access to the one or more services if the secondary credential may be received from the user device.

Further, at 308, the method 300 may include comparing, using a processing device (such as the processing device 206), the user credential with the stored credential.

Further, at 310, the method 300 may include analyzing, using the processing device, the current contextual data and the stored contextual data.

Further, at 312, the method 300 may include authenticating, using the processing device, the user device based on the comparing and the analyzing to determine a level of access to the one or more services of the resource by the user device. Further, in some embodiments, the level of access may include at least one of a full access to the one or more services, a limited access to the one or more services, and a no access to the one or more services.

Figure 4:
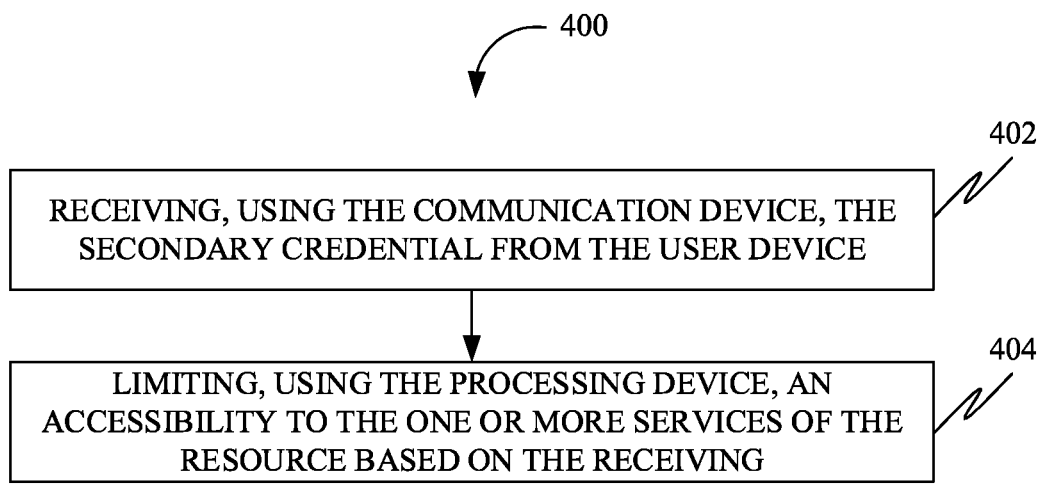
FIG. 4 is a flowchart of a method to facilitate restricting access to the one or more services, in accordance with some embodiments.

FIG. 4 is a flowchart of a method 400 to facilitate restricting access to the one or more services, in accordance with some embodiments. Accordingly, at 402, the method 400 may include receiving, using the communication device, the secondary credential from the user device.

Further, at 404, the method 400 may include limiting, using the processing device, an accessibility to the one or more services of the resource based on the receiving.

Further, in some embodiments, the method 400 may include initiating, using the processing device, an implicit communication with at least one authorized device based on the limiting. Further, the at least one authorized device may be operated by at least one appropriate authority (such as, but not limited to, a bank official, police personnel, government official, etc.).

Figure 5:
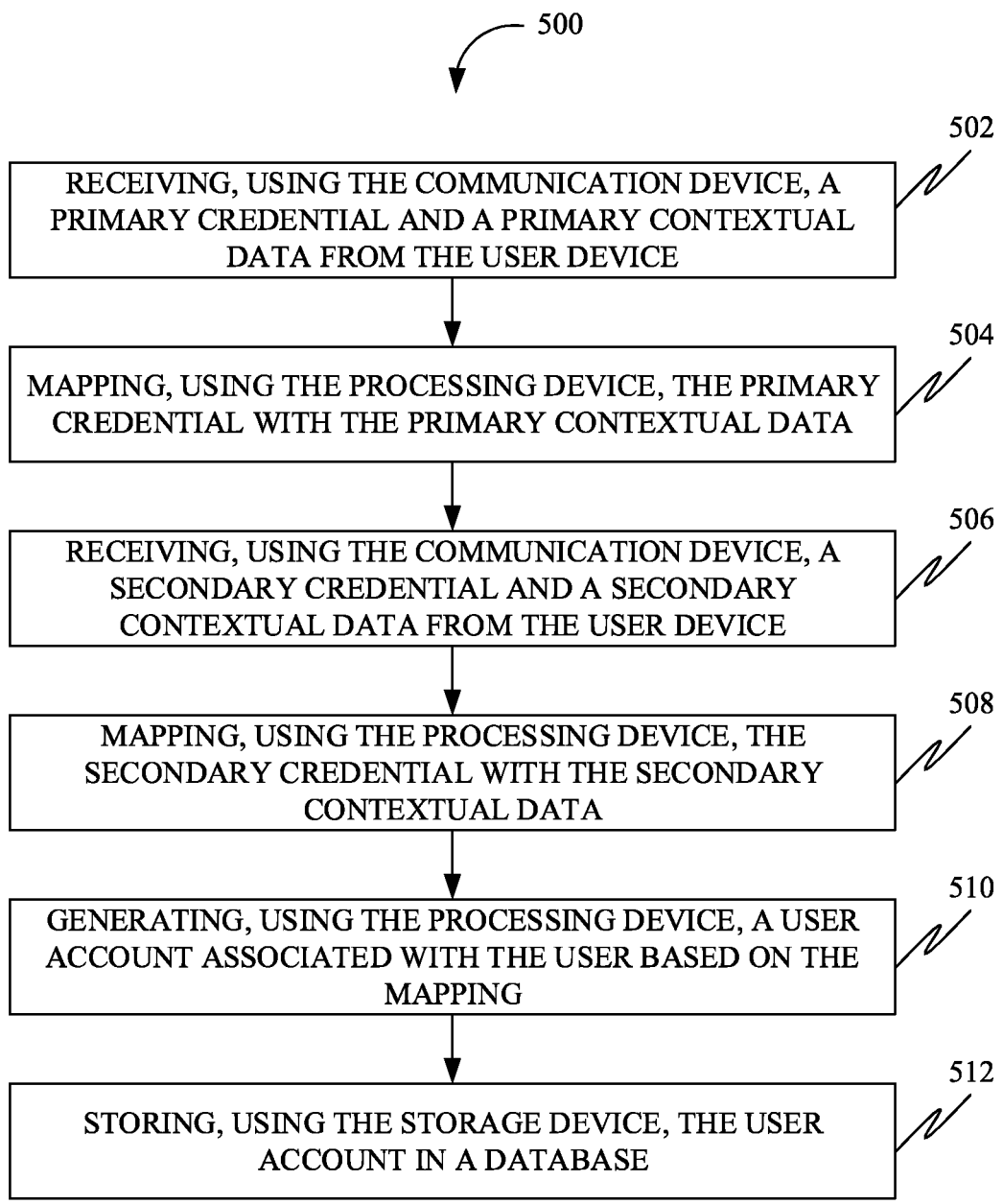
FIG. 5 is a flowchart of a method to facilitate creating a user account using a plurality of user credentials, in accordance with some embodiments.

FIG. 5 is a flowchart of a method 500 to facilitate creating a user account using a plurality of user credentials, in accordance with some embodiments. Accordingly, at 502, the method 500 may include receiving, using the communication device, a primary credential and a primary contextual data from the user device. Further, the primary credentials, in an instance, may be credentials that may be required from the user in order to access a one or more of services from a resource. The resource, in an instance, may be a physical and/or a digital resource that may be configured to provide the one or more services. The resource, in an instance, may include, but not limited to, a server, an e-wallet, an email account, a website, a vault, a bank account, etc. Further, the one or more services, in an instance, may be facilities offered by the resource to the user. For instance, the one or more services may include, but not limited to, accessing emails, and/or transaction of assets (such as e-funds, data, crypto keys, crypto-currencies, etc.). In some embodiments, the primary credentials, in an instance, may be variables that may reflect an identity of a user. The primary credentials may include, but not limited to, a username and/or a password (or PIN) that may be generated by the user. The username and/or the password, in an instance, may include a string of characters and/or numbers that may be easily remembered by the user. For instance, the primary credential may include password such as "example 1234". Further, in some embodiments, the primary credentials may include biometric variables that may be unique for each user. The biometric variables, in an instance, may include, but not limited to, fingerprint, palm veins, palm print, face recognition, DNA, hand geometry, iris recognition, retina, voice, odor/scent, etc. associated with the user. Further, the biometric variables, in an instance, may be sensed by a one or more of sensors (such as electro-optical sensors, microphones, IR sensors, etc.) that may be embedded within the user device. The user device, in an instance, may be any IoT based device that may be configured to communicate with the online platform 100. Further, the user device, in an instance, may deliver an interface to the user that may allow the user to provide the primary credential to the online platform 100. Further, the user device, in an instance, may include, but not limited to, a smartphone, a smartwatch, a PC, a laptop, etc. Further, the primary contextual data, in an instance, may be any data that may reflect a surrounding environment condition, and/or a variation in physical, chemical and/or biological variables associated with the user and/or the user device. The primary contextual data, in one embodiment, may include, but not limited to, a location and/or an IP address associated with the user device from where the user may be providing the primary credential to the online platform 100 in order to access the one or more services from the resource. Further, in some embodiments, the primary contextual data may include, but not limited to, a time and/or a day when the user may be providing the primary credential to the online platform 100 through the user device. For instance, the primary contextual data for a user that may be providing the primary credential to the online platform 100 from a location (such as a home of the user) through the user device (such as a smartphone) may include the IP address associated with the user device (and/or a network with which the user device may be connected at the home) along with the time and/or date when the user may be providing the primary credential to the online platform 100. Further, the primary contextual data, in an instance, may be sensed by the one or more sensors (such as location sensors, position sensors, motion sensors, etc.) that may be embedded within the user device.

Further, at 504, the method 500 may include mapping, using the processing device, the primary credential with the primary contextual data. Accordingly, the online platform 100, in an instance, may be configured to map the primary credential with the primary contextual data at the time of generating the user account associated with the user. The primary credential that may be mapped with the primary contextual data, in an instance, may reflect that the primary credential may only be used at a setting (such as the location, the time, and/or the date) that may be represented with the primary contextual data. For instance, the user may be using the primary credential (such as the username and/or the password) at the setting (such as the home of the user) that may be represented with the primary contextual data (such as the IP address associated with the user device used by the user at home).

Further, at 506, the method 500 may include receiving, using the communication device, a secondary credential and a secondary contextual data from the user device. Accordingly, the secondary credential, in an instance, may be credentials associated with the user that may be required to access the one or more services when the user may be present at a setting (such as, but not limited to, a location, and/or a time) other than the setting represented by the primary contextual data. For instance, the secondary credential may be provided by the user to access the one or more services when the user may be present at a location (other than the home of the user) such as a hotel where a network that may be providing the one or more services may not be secure. Further, in some embodiments, the secondary credentials used by the user for accessing the one or more services, in an instance, may restrict the user from fully accessing the one or more services. For instance, the user may be restricted by the online platform 100 from transferring an electronic fund above a threshold amount (such as $100 that may be set by the user) when the user may be using the secondary credential for accessing the one or more services from the resource (such as an e-wallet). Further, in another instance, the user may be shown a limited balance in the e-wallet through the user device when the user may be using the secondary credential for accessing the one or more services. Further, in some embodiments, the use of secondary credentials to access the one or more services, in an instance, may allow the online platform 100 to activate an implicit communication with one or more devices. The implicit communication, in an instance, may include an exchange of one or more information between the one or more devices. The one or more devices, in an instance, may be IoT based devices that may be operated by appropriate authorities (such as, but not limited to, a bank, and/or police etc.) that may need to be notified by the online platform 100 about a malicious use of the one or more services. The one or more information, in an instance, may include alerts (such as emails, messages, voice alerts, voicemails, etc.) that may be transmitted to the one or more devices in order to alert the appropriate authorities. For example, the online platform 100 may notify and/or alert the appropriate authority (such as the bank) about malicious activities with regard to the one or more services (such as a transfer of money) initiated by the user when the user may provide the secondary credentials for accessing the one or more services. Further, in the aforementioned example, the user may be providing the secondary credentials in a situation where the user may be forcefully asked to initiate the one or more services. Further, the secondary contextual data, in an instance, may be any data that may reflect a setting (such as a surrounding environment condition, and/or a variation in physical, chemical and/or biological variables associated with the user and/or the user device) when the user may provide the secondary credential in order to access the one or more services. Further, the secondary contextual data, in an instance, may be different from the primary contextual data. The secondary contextual data, in an instance, may include the settings (such as a location, and/or a time, etc.) when the user may not wish to provide and/or reveal the primary credentials in order to access the one or more services. For example, the user may not wish to reveal and/or provide the primary credential (such as a PIN for an e-wallet) for accessing the one or more services (such as transferring e-funds) from the resource (such as the e-wallet) when the user may be present at a location (other than the home of the user) such as a hotel where a network that may be providing the one or more services may be weak and/or prone to data leak and/or theft. In the aforementioned example, the user may provide the secondary credentials instead of the primary credentials in order to access the one or more services at the location such as the hotel. Further, the secondary credential may be linked (and/or locked) with the location such as the hotel. Therefore, even if the secondary credential may get leaked from a weak network of the hotel, the secondary credential may not be of any value for a malicious person (such as a hacker) that may be present at a location away from the hotel.

Further, at 508, the method 500 may include mapping, using the processing device, the secondary credential with the secondary contextual data. Accordingly, the online platform 100, in an instance, may be configured to map and/or link the secondary credential with the secondary contextual data at the time of generating the user account associated with the user. The secondary credential that may be mapped with the secondary contextual data, in an instance, may reflect that the secondary credential may only be used at a setting (such as the location, the time, and/or the date) that may be represented with the secondary contextual data. For instance, the user may be using the secondary credential (such as a second password) at the setting (such as a hotel) that may be represented with the secondary contextual data (such as the IP address associated with a network used by the user at the hotel).

Further, at 510, the method 500 may include generating, using the processing device, a user account associated with the user based on the mapping. Accordingly, the online platform 100, in an instance, may be configured to generate the user account associated with the user by using the primary credentials, the secondary credentials, the primary contextual data, and/or the secondary contextual data received from the user device. Further, the user account, in an instance, may be a profile associated with the user. The profile, in an instance, may reflect any information related to the user that may be required in order to access the one or more services from the resource. The user account, in an instance, may comprise of information related to the user such as (but not limited to) the primary credentials mapped with the primary contextual data, and/or the secondary credentials mapped with the secondary contextual data, and/or other information, etc. Further, the resources that may need to be accessed by multiple users, in an instance, may require multiple user accounts associated with the multiple users.

Further, at 512, the method 500 may include storing, using the storage device, the user account in a database. Accordingly, the online platform 100, in an instance, may be configured to store the user account associated with the user in the database. The database, in an instance, may be a storage space that may store the user account associated with the user in an organized form that may be accessed electronically by the online platform 100.

Figure 6:
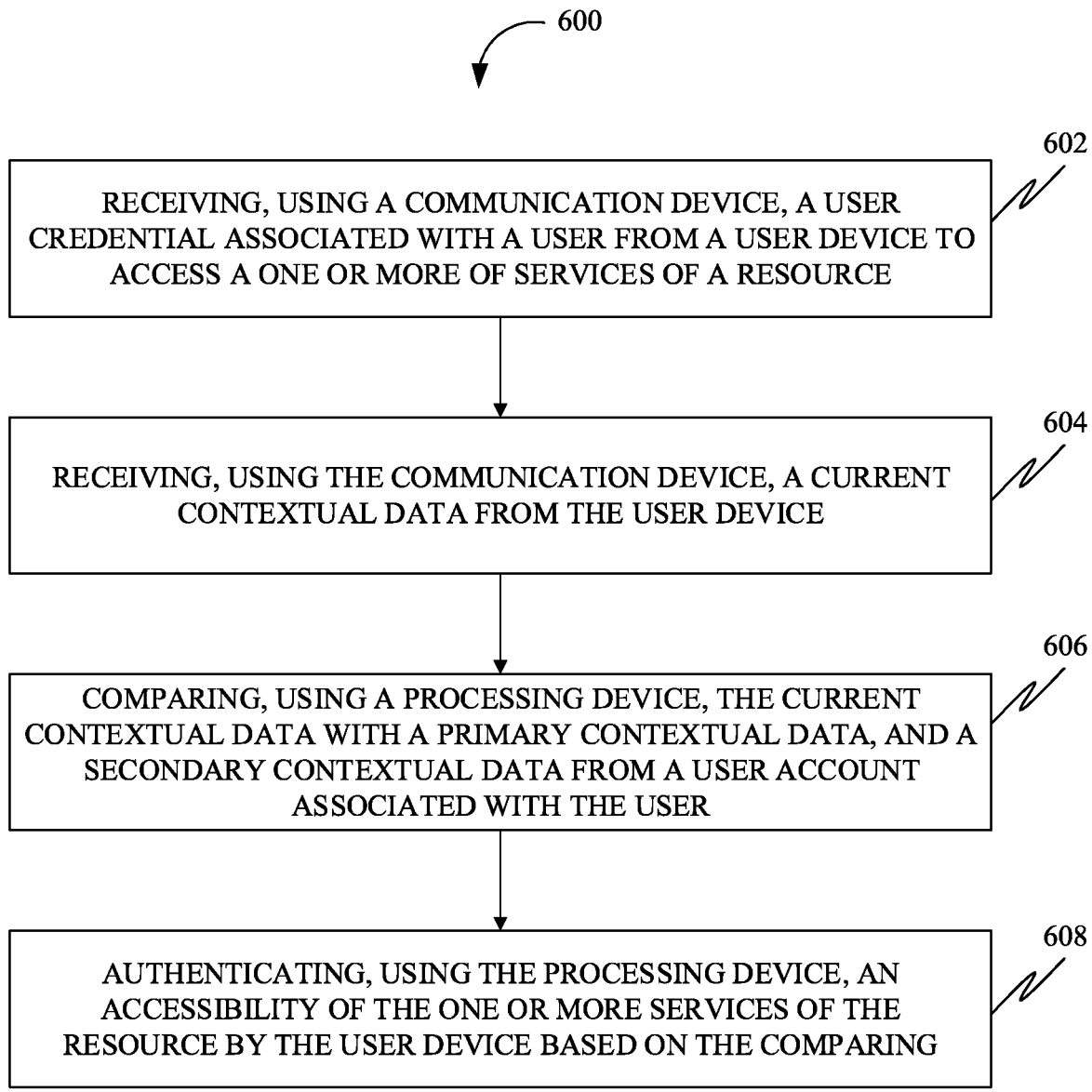
FIG. 6 illustrates a flowchart of a method to facilitate verifying a user based on a user credential, and/or a current contextual data from a user device, in accordance with some embodiments.

FIG. 6 illustrates a flowchart of a method 600 to facilitate authenticating a user based on a user credential, and/or a current contextual data from a user device, in accordance with some embodiments. Accordingly, at 602, the method 600 may include a step of receiving, using a communication device, a user credential associated with a user from a user device to access a one or more of services of a resource. Further, the user credential, in an instance, may be credentials provided by the user to access the one or more services of the resource. The resource, in an instance, may be a physical and/or a digital resource that may be configured to provide the one or more services to the user. The resource, in an instance, may include, but not limited to, a server, an e-wallet, an email account, a website, a vault, a bank account, etc. Further, the one or more services, in an instance, may be facilities offered by the resource to the user. For instance, the one or more services may include, but not limited to, accessing emails, and/or transaction of assets (such as e-funds, data, crypto keys, crypto-currencies, etc.). Further, the user credential associated with the user, in an instance, may include a primary credential, and/or a secondary credential. The primary credential, in an instance, may be a main and/or key user credential that may be provided by the user in order to fully access the one or more services from the resource. Further, the user, in an instance, may wish to protect the primary credential from an online leak and/or data theft by malicious individuals such as hackers. Further, the user, in an instance, may not want to reveal the primary credential outside a secure network. For instance, the user may not wish to provide the primary credential (such as a password, and/or a PIN) in order to access the one or more services (such as transferring funds) when the user device may be connected with a weak network such as a public Wi-Fi. Further, in some embodiments, the primary credentials may include, but not limited to, a username and/or a password (or PIN) that may be generated by the user. The username and/or the password, in an instance, may include a string of characters and/or numbers that may be easily remembered by the user. For instance, the primary credential may include password such as "example 1234". Further, in some embodiments, the primary credentials may include biometric variables that may be unique for each user. The biometric variables, in an instance, may include, but not limited to, fingerprint, palm veins, palm print, face recognition, DNA, hand geometry, iris recognition, retina, voice, odor/scent, etc. associated with the user. Further, the biometric variables, in an instance, may be sensed by a one or more of sensors (such as electro-optical sensors, microphones, IR sensors, etc.) that may be embedded within the user device. The user device, in an instance, may be any IoT based device that may be configured to communicate with the online platform 100. Further, the user device, in an instance, may deliver an interface to the user that may allow the user to provide the primary credential to the online platform 100. Further, the user device, in an instance, may include, but not limited to, a smartphone, a smartwatch, a PC, a laptop, etc. Further, the secondary credential, in an instance, may be the user credentials that may be used as an alternative to the primary credentials in a setting (such as a location, time, and/or date etc.) where the user may wish to protect the primary credential from the online leak and/or data theft by malicious individuals such as hackers. Further, the user, in an instance, may provide the secondary credentials (instead of the primary credentials) to access the one or more services from the resource in the setting where the network may be prone to leak and/or data theft. For instance, the user may provide the secondary credential (such as an alternate password) instead of the primary credential in order to access the one or more services (such as accessing emails) when the user device may be connected with a weak network such as a public Wi-Fi that may be prone to hacking. Further, in some embodiments, the secondary credentials provided by the user for accessing the one or more services, in an instance, may restrict the user from fully accessing the one or more services. For instance, the user may be restricted by the online platform 100 from transferring an electronic fund above a threshold amount (such as $100 that may be set by the user) when the user may be using the secondary credential for accessing the one or more services from the resource (such as an e-wallet). Further, in another instance, the user may be shown a limited balance in the e-wallet through the user device when the user may be using the secondary credential for accessing the one or more services. Further, in some embodiments, the use of secondary credentials to access the one or more services, in an instance, may allow the online platform 100 to activate an implicit communication with one or more devices. The implicit communication, in an instance, may include an exchange of one or more information between the one or more devices. The one or more devices, in an instance, may be IoT based devices that may be operated by appropriate authorities (such as, but not limited to, bank manager, and/or police etc.) that may need to be notified by the online platform 100 about a malicious use of the one or more services. Further, the one or more information, in an instance, may include alerts (such as emails, messages, voice alerts, voicemails, etc.) that may be transmitted to the one or more devices in order to alert the appropriate authorities. For example, the online platform 100 may notify and/or alert the appropriate authorities (such as a bank) about malicious activities with regard to the one or more services (such as a transfer of money) initiated by the user when the user may provide the secondary credentials for accessing the one or more services. Further, in the aforementioned example, the user may be providing the secondary credentials in a situation where the user may be forcefully asked to initiate the one or more services.

Further, at 604, the method 600 may include a step of receiving, using the communication device, a current contextual data from the user device. Accordingly, the current contextual data, in an instance, may be a real-time data that may reflect a setting (such as a surrounding environment condition, and/or a variation in physical, chemical and/or biological variables associated with the user and/or the user device) when the user may provide the user credential in order to access the one or more services. Further, the current contextual data, in an instance, may be sensed by the one or more sensors (such as location sensors, orientation sensors, temperature sensors, motion sensors, etc.) that may be embedded within the user device.

Further, at 606, the method 600 may include a step of comparing, using a processing device, the current contextual data with a primary contextual data, and a secondary contextual data from a user account associated with the user. Accordingly, the primary contextual data, in an instance, may be any data that may reflect a setting (such as a surrounding environment condition, and/or a variation in physical, chemical and/or biological variables associated with the user and/or the user device) that may be considered to be safe by the user with regard to the usage of primary credentials in order to access the one or more services. For instance, the primary contextual data may include (but not limited to) an IP address associated with a network and/or the user device at a location (such as a home of the user) that may be secure for revealing the primary credentials in order to access the one or more services. Further, the secondary contextual data, in an instance, may be any data that may reflect a setting (such as a surrounding environment condition, and/or a variation in physical, chemical and/or biological variables associated with the user and/or the user device) that may not be considered to be safe by the user with regard to the usage of the primary credentials in order to access the one or more services. Further, the secondary contextual data, in an instance, may be different from the primary contextual data. The secondary contextual data, in an instance, may include the settings (such as a location, and/or a time, etc.) when the user may not wish to provide and/or reveal the primary credentials in order to access the one or more services. For example, the user may not wish to reveal and/or provide the primary credential (such as a PIN for an e-wallet) for accessing the one or more services (such as transferring e-funds) from the resource (such as the e-wallet) when the user may be present at a location (other than the home of the user) such as a hotel where a network that may be providing the one or more services may be weak and/or prone to data leak and/or theft. In the aforementioned example, the user may provide the secondary credentials (instead of the primary credentials) in order to access the one or more services at the location such as the hotel. Further, the secondary credential may be linked (and/or locked) with the location such as the hotel. Therefore, even if the secondary credential may get leaked from a weak network of the hotel, the secondary credential may not be of any value for a malicious person (such as a hacker) that may be present at a location away from the hotel. Further, the user account, in an instance, may be a profile associated with the user. The profile, in an instance, may reflect any information related to the user that may be required in order to access the one or more services from the resource. The user account, in an instance, may comprise of information related to the user such as (but not limited to) the primary credentials mapped with the primary contextual data, and/or the secondary credentials mapped with the secondary contextual data, and/or other information, etc.

Further, at 608, the method 600 may include a step of authenticating, using the processing device, an accessibility of the one or more services of the resource by the user device based on the comparing. Accordingly, the online platform 100, in an instance, may be configured to authenticate the accessibility of the one or more services by the user based on the comparing of the user credentials and the current contextual data with the user account associated with the user. Further, in one embodiment, the user may be authenticated by the online platform 100 and/or may be provided a full access to the one or more services of the resource when the user credential provided by the user through the user device matches with the primary credential associated with the user, and the current contextual data matches with the primary contextual data. For instance, the user may be authenticated and/or may be provided the full access to the one or more services (such as accessing emails) when the user credential provided by the user matches with the primary credential, along with the current contextual data matching with the primary contextual data. Further, in another embodiment, the user may be authenticated by the online platform 100 and/or may be provided a limited access to the one or more services of the resource when the user credential provided by the user through the user device matches with the secondary credential associated with the user, and the current contextual data matches with the secondary contextual data. For instance, the user may be authenticated and/or may be provided the limited access to the one or more services (such as transferring e-funds from an e-wallet) when the user credential provided by the user matches with the secondary credential, along with the current contextual data matching with the secondary contextual data. Further, in another instance, the user may be shown a reduced money balance in the e-wallet when the user credential provided by the user matches with the secondary credential along with the current contextual data matches with the secondary contextual data. Further, in some embodiments, the user may not be authenticated by the online platform 100 and/or may not be provided any access to the one or more services of the resource when the user credential provided by the user may not match with the primary credential (and/or the secondary credential), and/or the current contextual data not match with the primary contextual data (and/or the secondary contextual data).

Figure 7:
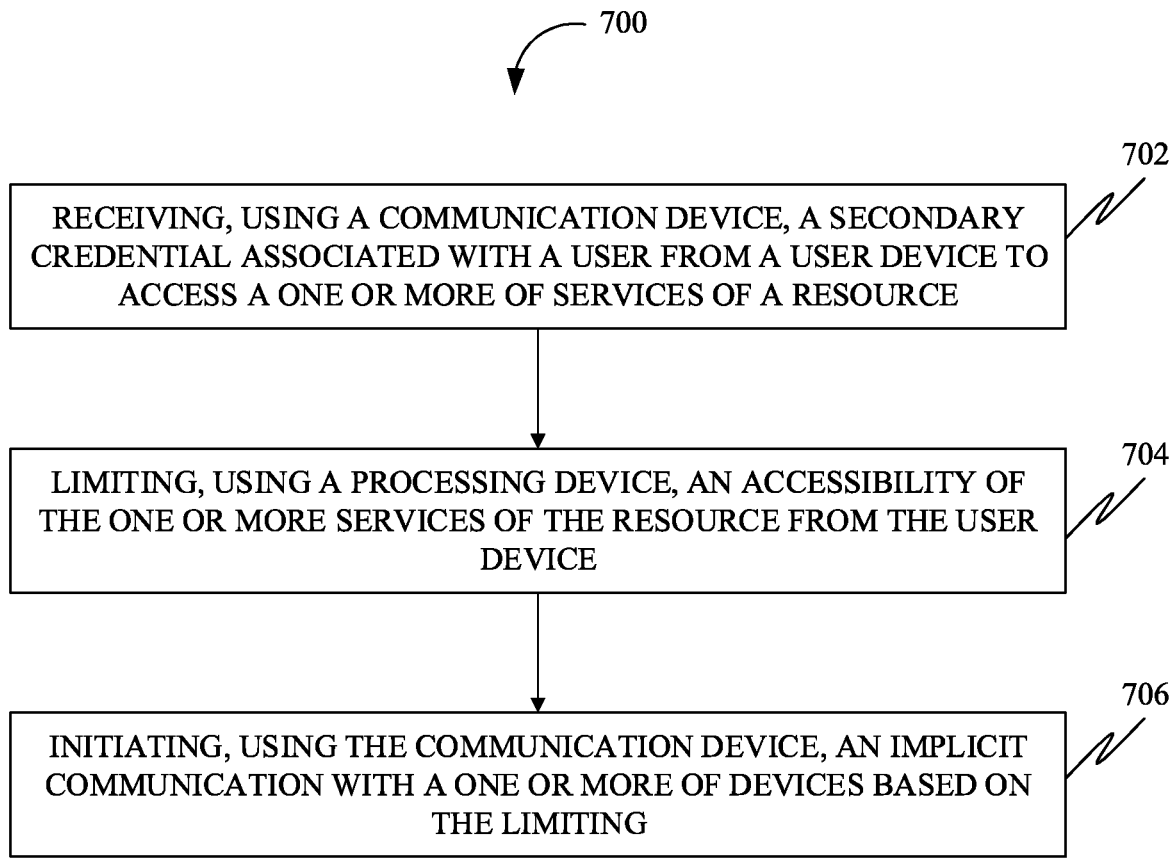
FIG. 7 illustrates a flowchart of a method to facilitate restrictive an accessibility of a resource for a user, in accordance with some embodiments.

FIG. 7 illustrates a flowchart of a method 700 to facilitate limiting an accessibility of a resource by a user, in accordance with some embodiments. Accordingly, at 702, the method 700 may include a step of receiving, using a communication device, a secondary credential associated with a user from a user device to access a one or more of services of a resource. Further, the secondary credential, in an instance, may be credentials provided by the user to access the one or more services of the resource in a restricted and/or in a limited way. Further, the resource, in an instance, may be a physical and/or a digital resource that may be configured to provide the one or more services to the user. The resource, in an instance, may include, but not limited to, a server, an e-wallet, an email account, a website, a vault, a bank account, etc. Further, the one or more services, in an instance, may be facilities offered by the resource to the user. For instance, the one or more services may include, but not limited to, accessing emails, and/or transaction of assets (such as e-funds, data, crypto keys, crypto-currencies, etc.).

Further, at 704, the method 700 may include a step of limiting, using a processing device, an accessibility of the one or more services of the resource from the user device. Accordingly, the online platform 100, in an instance, may be configured to limit and/or restrict the accessibility of the one or more services by the user device when the secondary credential associated with the user may be received by the online platform 100. For instance, the user may be restricted by the online platform 100 from transferring an electronic fund above a threshold amount (such as $100 threshold amount that may be set by the user) when the user may be providing the secondary credential for accessing the one or more services from the resource (such as an e-wallet). Further, in another instance, the user may be shown a limited balance in the e-wallet (such as showing $2000 instead of an actual amount of $50000 that may be present in the e-wallet of the user) through the user device when the user may be providing the secondary credential for accessing the one or more services. Further, the user, in an instance, may wish to limit the accessibility of the one or more services in a situation where the user may be forced by a malicious person to access the one or more services and/or the user may not be having any other alternative than to provide credentials. For instance, the user may limit the accessibility of the one or more services when the user may be physically forced by a person to provide the credentials (where life is more important than money).

Further, at 706, the method 700 may include a step of initiating, using the communication device, an implicit communication with a one or more of devices based on the limiting. Accordingly, the use of secondary credentials to access the one or more services, in an instance, may allow the online platform 100 to activate the implicit communication with the one or more devices. The implicit communication, in an instance, may include an exchange of one or more information between the one or more devices. The one or more devices, in an instance, may be IoT based devices that may be operated by appropriate authorities (such as, but not limited to, bank manager, and/or police etc.) that may need to be notified by the online platform 100 about a malicious use of the one or more services through the user device. Further, the one or more information, in an instance, may include alerts (such as emails, messages, voice alerts, voicemails, etc.) that may be transmitted to the one or more devices in order to notify the appropriate authorities. For example, the online platform 100 may notify and/or alert the appropriate authorities (such as a bank manager) about malicious activities with regard to the one or more services (such as a transfer of money) initiated by the user when the user may provide the secondary credentials for accessing the one or more services. Further, the appropriate authorities, in an instance, may be configured to take an appropriate action when notified by the online platform 100. For instance, a bank may effectively block a transfer of fund internally and/or also may report a recipient account as being a perpetrator.

Figure 8:
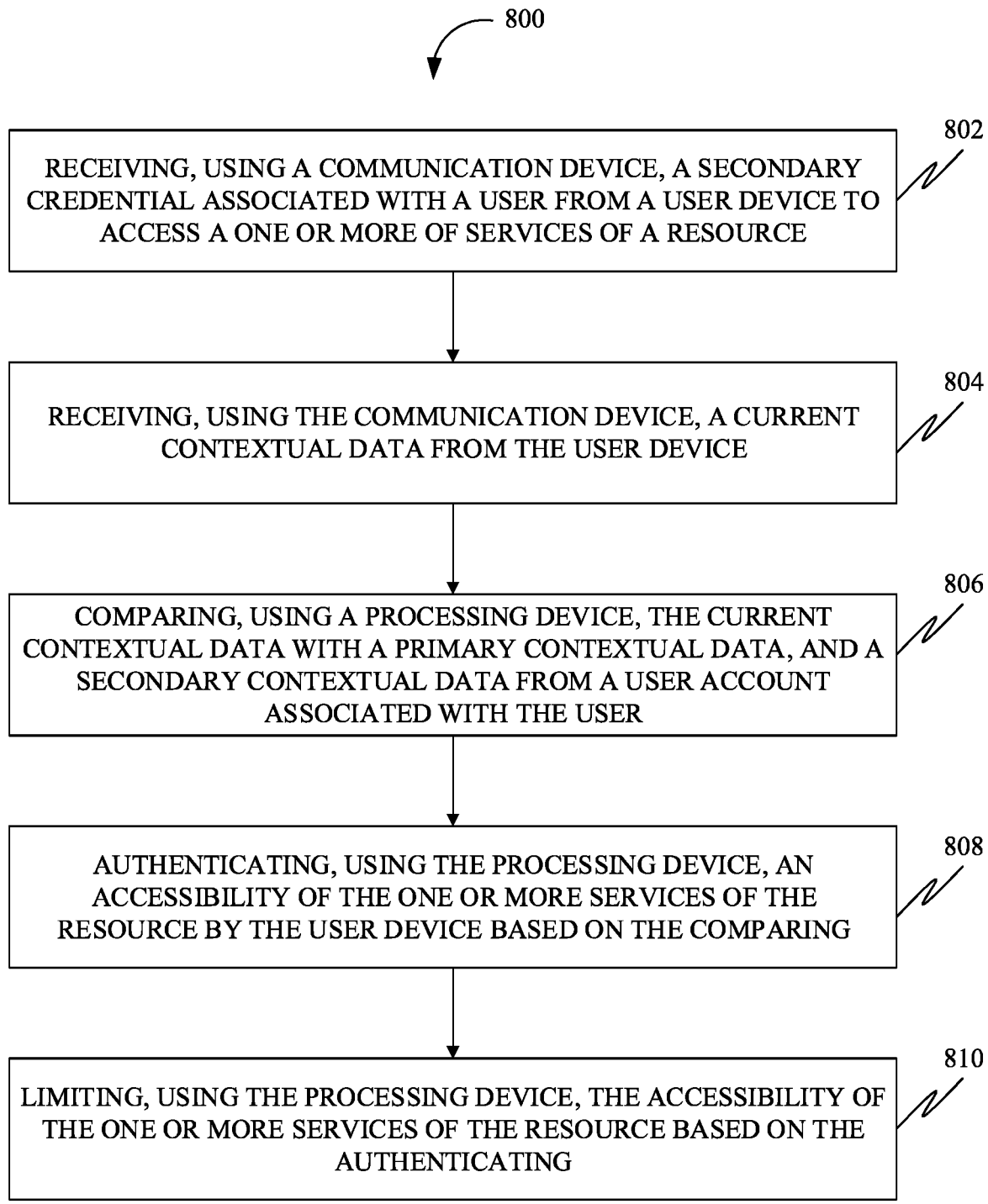
FIG. 8 illustrates a flowchart of a method to facilitate verifying a user and/or limiting an accessibility of a one or more of services of a resource based on a secondary credential, and/or a current contextual data received from a user device, in accordance with some embodiments.

FIG. 8 illustrates a flowchart of a method 800 to facilitate authenticating a user and/or limiting an accessibility of a one or more of services of a resource based on a secondary credential, and/or a current contextual data received from a user device, in accordance with some embodiments. The method, in an instance, may be used for situations when the user may be using the one or more services at a location where a network providing the one or more services may be weak (such as a public Wi-Fi) and/or where a malicious person (such as a hacker) may also be present. Accordingly, at 802, the method 800 may include a step of receiving, using a communication device, a secondary credential associated with a user from a user device to access a one or more of services of a resource. Further, the secondary credential, in an instance, may be credentials provided by the user to access the one or more services of the resource in a restricted and/or in a limited way. The resource, in an instance, may be a physical and/or a digital resource that may be configured to provide the one or more services to the user. The resource, in an instance, may include, but not limited to, a server, an e-wallet, an email account, a website, a vault, a bank account, etc. Further, the one or more services, in an instance, may be facilities offered by the resource to the user. For instance, the one or more services may include, but not limited to, accessing emails, and/or transaction of assets (such as e-funds, data, crypto keys, crypto-currencies, etc.). Further, the user device, in an instance, may be any IoT based device that may be configured to communicate with the online platform 100. Further, the user device, in an instance, may deliver an interface to the user that may allow the user to provide the secondary credential to the online platform 100. Further, the user device, in an instance, may include, but not limited to, a smartphone, a smartwatch, a PC, a laptop, etc.

Further, at 804, the method 800 may include a step of receiving, using the communication device, a current contextual data from the user device. Accordingly, the current contextual data, in an instance, may be a real-time data that may reflect a setting (such as a surrounding environment condition, and/or a variation in physical, chemical and/or biological variables associated with the user and/or the user device) when the user may provide the secondary credential in order to access the one or more services in a limited and/or a restricted way. Further, the current contextual data, in an instance, may be sensed by the one or more sensors (such as location sensors, orientation sensors, temperature sensors, motion sensors, etc.) that may be embedded within the user device.

Further, at 806, the method 800 may include a step of comparing, using a processing device, the current contextual data with a primary contextual data, and a secondary contextual data from a user account associated with the user. Accordingly, the primary contextual data, in an instance, may be any data that may reflect a setting (such as a surrounding environment condition, and/or a variation in physical, chemical and/or biological variables associated with the user and/or the user device) that may be considered to be safe by the user with regard to the usage of primary credentials in order to access the one or more services. For instance, the primary contextual data may include (but not limited to) an IP address associated with a network and/or the user device at a location (such as a home of the user) that may be secure for revealing the primary credentials in order to access the one or more services. Further, the primary credentials, in an instance, may be credentials that may be provided by the user in order to fully access the one or more services from the resource. Further, the secondary contextual data, in an instance, may be any data that may reflect a setting (such as a surrounding environment condition, and/or a variation in physical, chemical and/or biological variables associated with the user and/or the user device) that may not be considered to be safe by the user with regard to the usage of the primary credentials in order to access the one or more services. Further, the secondary contextual data, in an instance, may be different from the primary contextual data. The secondary contextual data, in an instance, may include the settings (such as a location, and/or a time, etc.) when the user may not wish to provide and/or reveal the primary credentials in order to access the one or more services. For example, the user may not wish to reveal and/or provide the primary credential (such as a PIN for an e-wallet) for accessing the one or more services (such as transferring e-funds) from the resource (such as the e-wallet) when the user may be present at a location (other than the home of the user) such as a hotel where a network that may be providing the one or more services may be weak and/or prone to data leak and/or theft. In the aforementioned example, the user may provide the secondary credentials instead of the primary credentials in order to limit an accessibility of the one or more services at the location such as a hotel. Further, the secondary credential may be linked (and/or locked) with the location such as the hotel. Therefore, if the secondary credential may get leaked from a weak network of the hotel, the secondary credential may not be of any value for a malicious person (such as a hacker) that may be present at a location away from the hotel. Further, even if the hacker may be present at the hotel, the hacker may not be able to fully exploit the one or more services because of a limited accessibility. Further, the user account, in an instance, may be a profile associated with the user. The profile, in an instance, may reflect any information related to the user that may be required in order to access the one or more services from the resource. The user account, in an instance, may comprise of information related to the user such as (but not limited to) the primary credentials mapped with the primary contextual data, and/or the secondary credentials mapped with the secondary contextual data, and/or other information, etc.

Further, at 808, the method 800 may include a step of authenticating, using the processing device, an accessibility of the one or more services of the resource by the user device based on the comparing. Accordingly, the online platform 100, in an instance, may be configured to authenticate the accessibility of the one or more services by the user based on the comparing of the current contextual data and the user account associated with the user. Further, in one embodiment, the user may be authenticated by the online platform 100 and/or may be provided a limited access to the one or more services of the resource when the secondary credential provided by the user through the user device matches with the secondary credentials stored in the user account associated with the user, and the current contextual data matches with the secondary contextual data. For instance, the user may be authenticated and/or may be provided the limited access to the one or more services (such as transferring e-funds from an e-wallet) when the secondary credential provided by the user through the user device matches with the secondary credential stored in the user account associated with the user, along with the current contextual data (and/or current location of the user) matching with the secondary contextual data (and/or location set by the user where the user may be using the secondary credentials instead of the primary credentials).

Further, at 810, the method 800 may include a step of limiting, using the processing device, the accessibility of the one or more services of the resource based on the authenticating. Accordingly, the online platform 100, in an instance, may be configured to limit and/or restrict the accessibility of the one or more services by the user device when the secondary credential associated with the user may be received by the online platform 100. For instance, the user may not be allowed to transfer an electronic fund above a threshold amount (such as $100 threshold amount that may be set by the user) when the user may be providing the secondary credential for accessing the one or more services from the resource (such as an e-wallet). Further, in another instance, the user may be shown a limited balance in the e-wallet (such as showing $2000 instead of an actual amount of $50000 that may be present in the e-wallet of the user) through the user device when the user may be providing the secondary credential for accessing the one or more services.

Figure 9:
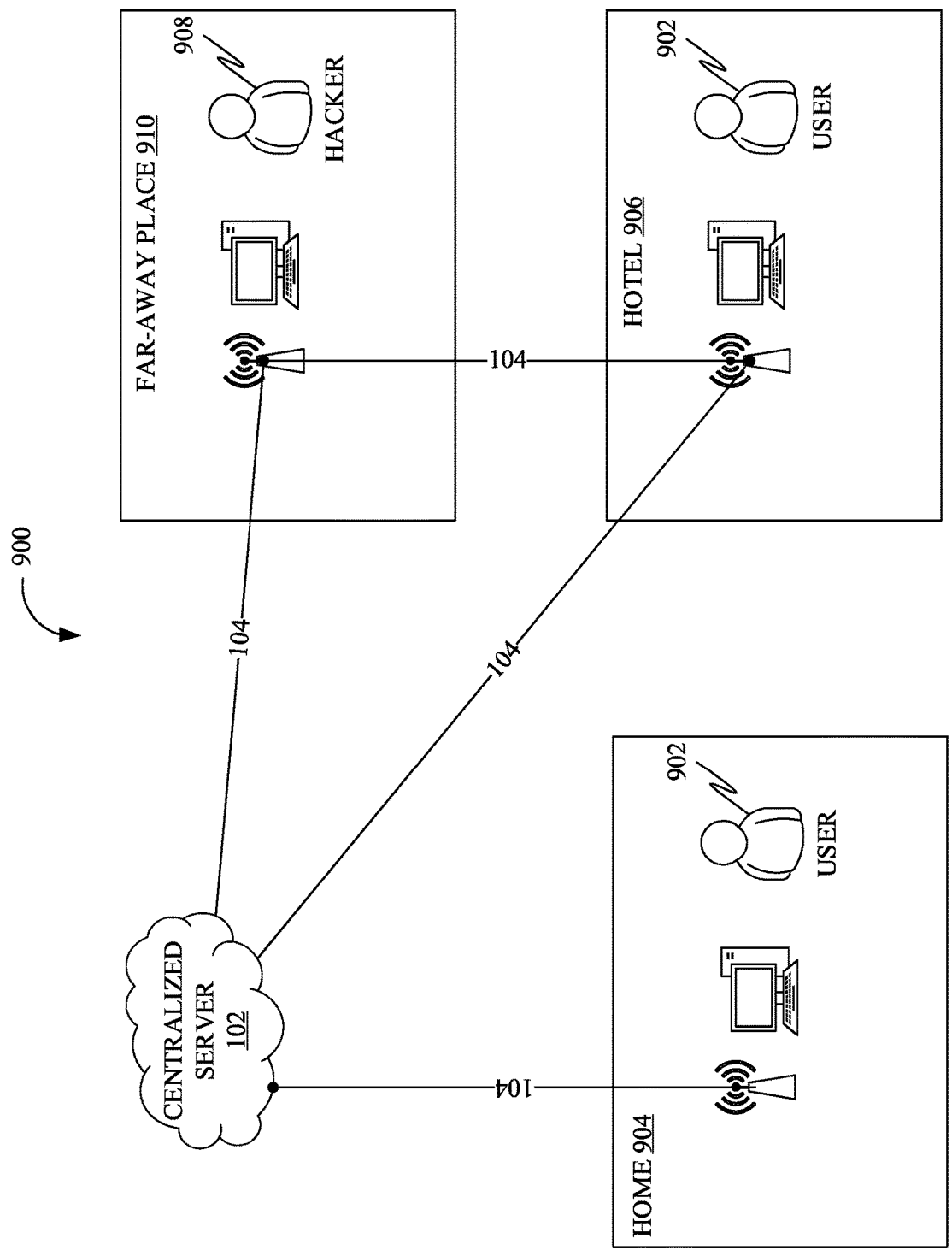
FIG. 9 is an exemplary representation of a system that may include a centralized server, a one or more of devices, a user at one or more locations, a hacker at an unknown location etc., in accordance with some embodiments.

FIG. 9 is an exemplary representation of a system 900 that may include a centralized server (such as the centralized server 102), a one or more of devices, a user (such as a user 902) at one or more locations (such as at home 904, and at a Hotel 906), a hacker (such as a hacker 908) at an unknown location (such as a far-away place 910) etc., in accordance with some embodiments. Accordingly, the centralized server 102, in an instance, may be configured to authenticate and/or provide an access to a one or more of services of a resource to the user based on credentials provided by the user, and/or contextual data obtained from the one or more devices. Further, the resource, in an instance, may be a physical and/or a digital resource that may be configured to provide the one or more services. The resource, in an instance, may include, but not limited to, a server, an e-wallet, an email account, a website, a vault, a bank account, etc. Further, the one or more services, in an instance, may be facilities offered by the resource to the user. For instance, the one or more services may include, but not limited to, accessing emails, and/or transaction of assets (such as e-funds, data, crypto keys, crypto-currencies, etc.). Further, the one or more devices, in an instance, may be IoT based devices that may be configured to communicate with the centralized server 102 over the communication network 104. Further, the hacker 908, in an instance, may be located at a far-away place 910 and/or may be configured to intercept into weak networks such as a public Wi-Fi of a hotel 906 where the user 902 may be present. Further, the user 902 may provide a secondary credential (instead of a primary credential) in order to access the one or more services at a location such as the hotel 906. Further, the secondary credential may be linked (and/or locked) with the location such as the hotel 906. Therefore, even if the secondary credential may get leaked from a weak network of the hotel, the secondary credential may not be of any value for a malicious person (such as the hacker 908) that may be present at a location away from the hotel 906. Further, the user 902, in an instance, may use the primary credentials (and/or main credentials) only at the location (such as the home 904 of the user 902) that may be secure for accessing the one or more services.

Figure 10:
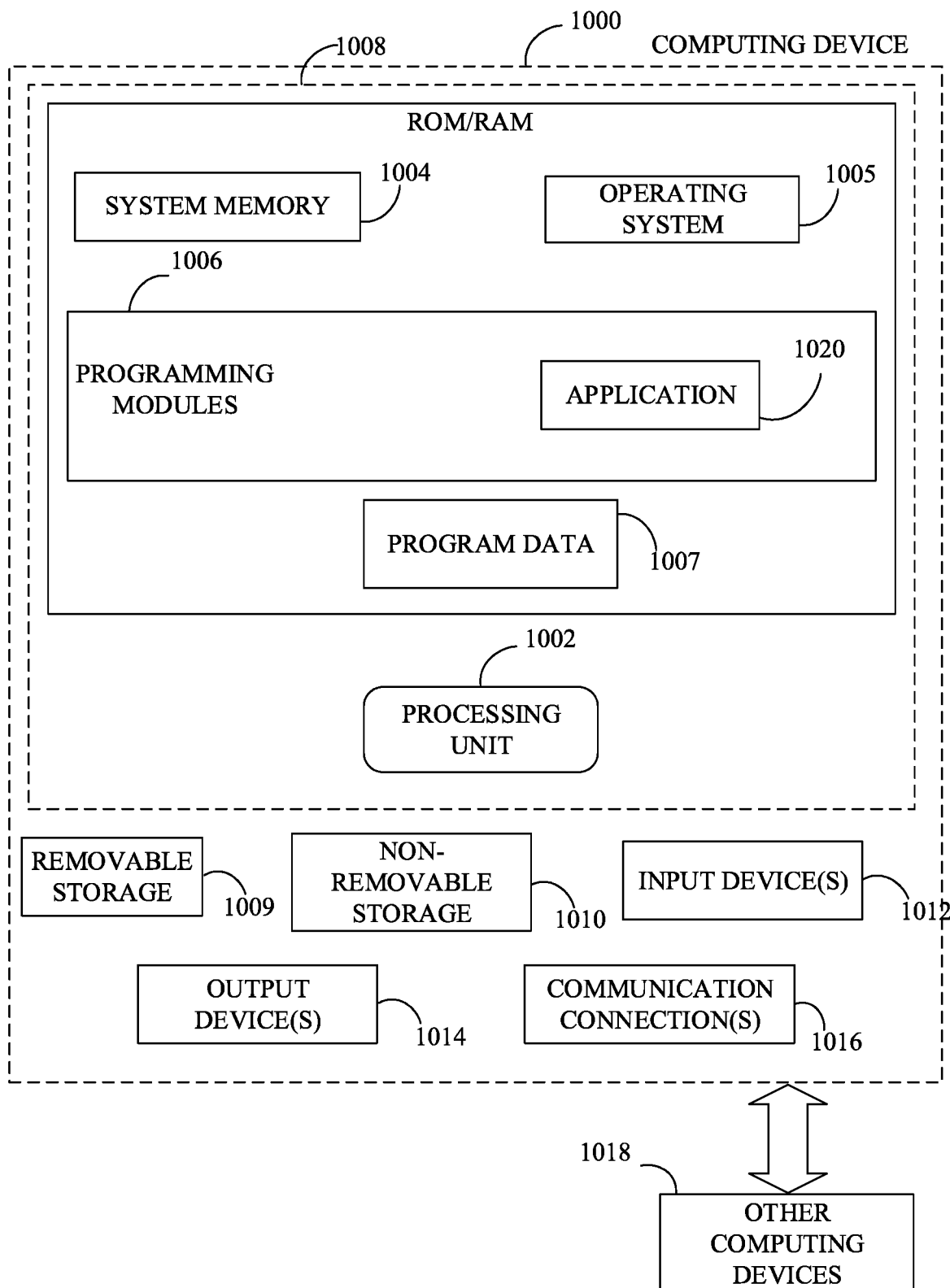
FIG. 10 is a block diagram of a computing device for implementing the methods disclosed herein, in accordance with some embodiments.

With reference to FIG. 10, a system consistent with an embodiment of the disclosure may include a computing device or cloud service, such as computing device 1000. In a basic configuration, computing device 1000 may include at least one processing unit 1002 and a system memory 1004. Depending on the configuration and type of computing device, system memory 1004 may comprise, but is not limited to, volatile (e.g. random-access memory (RAM)), non-volatile (e.g. read-only memory (ROM)), flash memory, or any combination. System memory 1004 may include operating system 1005, one or more programming modules 1006, and may include a program data 1007. Operating system 1005, for example, may be suitable for controlling computing device 1000's operation. In one embodiment, programming modules 1006 may include image-processing module, machine learning module. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and non-volatile, removable and non-removable media implemented in any method or technology for storage of information, such as computer-readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, a location sensor, a camera, a biometric sensor, etc. Output device(s) 1014 such as a display, speakers, a printer, etc. may also be included. The aforementioned devices are examples and others may be used.

Computing device 1000 may also contain a communication connection 1016 that may allow device 1000 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1004, including operating system 1005. While executing on processing unit 1002, programming modules 1006 (e.g., application 1020 such as a media player) may perform processes including, for example, one or more stages of methods, algorithms, systems, applications, servers, databases as described above. The aforementioned process is an example, and processing unit 1002 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method for facilitating security of a resource using a plurality of credentials, the method comprising:
receiving, using a communication device, a user credential associated with a user from a user device to access one or more services of the resource, wherein the resource comprises a single financial account;
obtaining, using the communication device, a current contextual data from the user device;
retrieving, using a storage device, a stored contextual data and a stored credential associated with the user from a database;
comparing, using a processing device, the user credential with the stored credential;
analyzing, using the processing device, the current contextual data and the stored contextual data;
authenticating, using the processing device, the user device based on the comparing and the analyzing to determine a level of access to the one or more services of the resource by the user device;
wherein the stored credential comprises at least one of a primary credential and a secondary credential;
wherein the user is provided a full access to the one or more services if only the primary credential is received from the user device without receiving the secondary credential, wherein the user is provided a limited access to the one or more services if only the secondary credential is received from the user device without receiving the primary credential;
restricting, using the processing device, the user from transferring an electronic fund above a threshold amount out of the single financial account if the secondary credential is received, and if the user credential is associated with the single financial account, wherein the threshold amount is set by the user;
outputting, using the communication device, a modified financial account balance if the secondary credential is received, and if the user credential is associated with the single financial account;
receiving, using the communication device, the primary credential and a primary contextual data from the user device;
mapping, using the processing device, the primary credential with the primary contextual data;
receiving, using the communication device, the secondary credential and a secondary contextual data from the user device;
mapping, using the processing device, the secondary credential with the secondary contextual data;
generating, using the processing device, a single user account associated with the user based on the mapping; and
storing, using the storage device, the single user account in a database.

2. The method of claim 1, wherein the resource comprises at least one of an email account, an e-wallet, a website, an E-vault, and a bank account.

3. The method of claim 1, wherein the one or more services comprises at least one of accessing emails, and transaction of assets.

4. The method of claim 1 further comprising:
receiving, using the communication device, the secondary credential from the user device; and
limiting, using the processing device, an accessibility to the one or more services of the resource based on the receiving.

5. The method of claim 4 further comprises initiating, using the processing device, an implicit communication with at least one authorized device based on the limiting, wherein the at least one authorized device is operated by at least one appropriate authority.

6. The method of claim 1, wherein the stored contextual data comprises at least one of the primary contextual data, and the secondary contextual data.

7. The method of claim 1, wherein the level of access comprises at least one of a full access to the one or more services, a limited access to the one or more services, and a no access to the one or more services.

8. A system for facilitating security of a resource using a plurality of credentials, the system comprising:
a communication device configured for:
receiving a user credential associated with a user from a user device to access one or more services of the resource,
wherein the resource comprises a single financial account; and
obtaining a current contextual data from the user device;
a storage device configured for retrieving a stored contextual data and a stored credential associated with the user from a database; and
a processing device configured for:
comparing the user credential with the stored credential;
analyzing the current contextual data and the stored contextual data;
authenticating the user device based on the comparing and the analyzing to determine a level of access to the one or more services of the resource by the user device;
wherein the stored credential comprises at least one of a primary credential and a secondary credential;
wherein the user is provided a full access to the one or more services if only the primary credential is received from the user device, wherein the user is provided a limited access to the one or more services if only the secondary credential is received from the user device;

restricting, using the processing device, the user from transferring an electronic fund above a threshold amount out of the single financial account if the secondary credential is received, and if the user credential is associated with the single financial account, wherein the threshold amount is set by the user;

outputting, using the communication device, a modified financial account balance if the secondary credential is received, and if the user credential is associated with the single financial account;

receiving, using the communication device, the primary credential and a primary contextual data from the user device;

mapping, using the processing device, the primary credential with the primary contextual data;

receiving, using the communication device, the secondary credential and a secondary contextual data from the user device;

mapping, using the processing device, the secondary credential with the secondary contextual data;

generating, using the processing device, a single user account associated with the user based on the mapping; and storing, using the storage device, the single user account in a database.

9. The system of claim 8, wherein the resource comprises at least one of an email account, an e-wallet, a website, an E-vault, and a bank account.

10. The system of claim 8, wherein the one or more services comprises at least one of accessing emails, and transaction of assets.

11. The system of claim 8, wherein the communication device is further configured for receiving the secondary credential from the user device; and the processing device is further configured for limiting an accessibility to the one or more services of the resource based on the receiving.

12. The system of claim 11, wherein the processing device is further configured for initiating an implicit communication with at least one authorized device based on the limiting, wherein the at least one authorized device is operated by at least one appropriate authority.

13. The system of claim 8, wherein the stored contextual data comprises at least one of the primary contextual data, and the secondary contextual data.

14. The system of claim 8, wherein the level of access comprises at least one of a full access to the one or more services, a limited access to the one or more services, and a no access to the one or more services.

* * * * *